W. J. MANNING.
BELT PULLEY FOR POWER TRANSMISSION.
APPLICATION FILED MAR. 8, 1919.

1,329,620.

Patented Feb. 3, 1920.

Witness
John M. Dobie

William Joseph Manning
Inventor,
by C. A. Snow & Co.,
his Attorneys.

UNITED STATES PATENT OFFICE.

WILLIAM JOSEPH MANNING, OF WOLVERHAMPTON, ENGLAND.

BELT-PULLEY FOR POWER TRANSMISSION.

1,329,620.  Specification of Letters Patent.  Patented Feb. 3, 1920.

Application filed March 8, 1919. Serial No. 281,431.

*To all whom it may concern:*

Be it known that I, WILLIAM JOSEPH MANNING, a subject of the King of England, residing at Green Lane Works, Dudley Road, Wolverhampton, England, have invented certain new and useful Improvements in Belt-Pulleys for Power Transmission, of which the following is a specification, reference being had to the accompanying drawings.

This invention comprises certain improvements in or relating to belt power transmission pulleys, particularly of small size such as of five to nine inches diameter; and it has for its object a metal pulley which is cheap to manufacture and which is readily and efficiently assembled on the shafting.

According to the present invention while the metal pulley is built up in sections, the sections are not held together by being gripped upon the shafting, but the pulley when assembled forms a self supporting structure, means being incorporated for gripping the pulley on the shafting.

In order that the invention may be clearly understood and readily carried into effect reference may be had to the accompanying drawings on which:—

Figure 1:
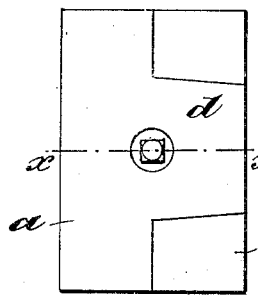
Figure 1 is an end view of the pulley constructed according to this invention.
Figure 2:
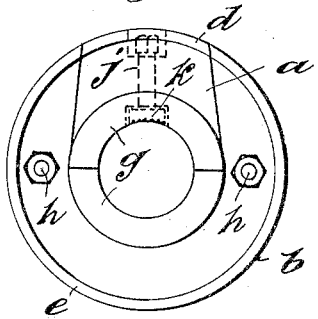
Fig. 2 is a face view.
Figure 3:
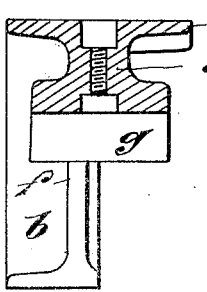
Fig. 3 is a section, on line $x$ $x$ of Fig. 1, of one half of the pulley.
Figure 4:
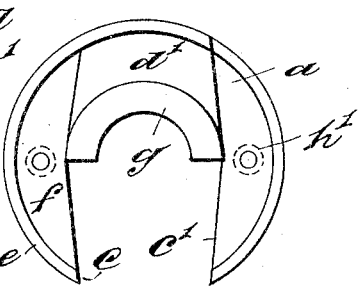
Fig. 4 is a face view of the pulley half shown by Fig. 3.
Figures 5, 6:
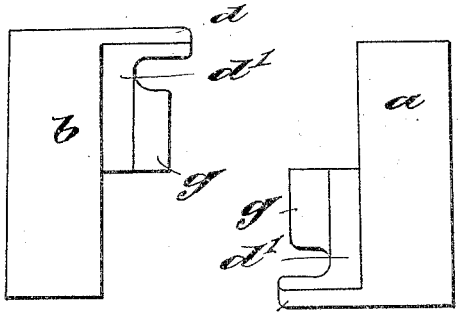
Figs. 5 and 6 are end views of the two pulley sections in the position for being slid together to constitute a pulley.

According to a convenient embodiment of the present invention the pulley preferably comprises two similar sections, $a$ and $b$, each section comprising a complete circumferential rim with the exception of a slot $c$ therein which will allow the shafting to pass therethrough. Each section, diametrically opposite the said slot, has a portion of the rim $d$ projecting therefrom, thus when the two portions are assembled the projection $d$ on the one enters the slot $c$ in the other and forms the complete pulley rim.

Each of the sections, which are preferably formed of similar castings, comprise the rim $e$, web $f$, and one half $g$ of the boss. The web has a slot $c^1$ therein forming a continuous slot with the slot in the rim, while the web has a thickened projecting part $d^1$ which with the said projecting part of the rim forms a wedge piece for fitting into the said slot of the other section. The width of the projecting part aforesaid is conveniently equal to the diameter of the boss where it joins with the half boss, but tapers toward the rim and therefore as the slot is correspondingly shaped the pulley can only be disassembled by a relative axial movement on the shafting.

To fasten the two sections together bolts $h$ are passed through the webs of the sections. If desired a boss $h^1$ can be cast on the web where the bolt passes therethrough, which boss is adapted, when the pulley sections are together, to fit into a hole in the other web, thus relieving the strain on the bolts.

Any desired means may be adapted for fastening the pulley to the shafting. According to one form thereof a screw threaded hole is formed radially through the pulley section at the thickened projecting wedge part aforementioned, the outer end of the hole having an enlarged end for receiving the head of the screwed pin $j$ and for permitting the spanner to be applied to the head. The lower end of the tapped hole at the boss is also enlarged to receive therein a cylindrical member $k$. The face of this cylindrical member is serrated so as to provide a sufficiently large and good gripping surface, the screw pin being adapted to press such cylindrical member on the shafting to give the frictional grip thereon. A fastening means as aforedescribed may be incorporated in connection with each section of the pulley.

According to a modified form of the invention, in lieu of the slots $c^1$ and projecting parts $d^1$ being tapered the same may be stepped, the shoulders thus formed preventing the pulley sections being disassembled except by an endwise movement.

Claims:

1. A power transmission belt pulley, comprising two sections, each section comprising a rim, a slot in the rim for the passage of the shaft therethrough and a portion of rim laterally projecting and located diametrically opposite said slot, whereby the projecting portion of one rim enters the slot in the other rim to form a complete pulley rim, each section also comprising one half the pulley boss, means for fastening the pulley sections together, and means for securing the pulley to the shaft, substantially as set forth.

2. A power transmission belt pulley, comprising two similar sections, each section comprising a rim, a slot in the rim for the passage of the shaft therethrough, a lateral projection located diametrically opposite said slot and forming a portion of the rim, whereby the projection of one section enters the slot in the other for forming a complete pulley rim, the projection and slot being shaped so as to permit of disassembling only by a movement axially of the shaft, each section also comprising one half the pulley boss, means for fastening the two pulley sections together, and means for fastening the pulley to the shafting, substantially as set forth.

3. A power transmission belt pulley, comprising two similar sections, each section comprising a rim, web and half boss, a slot in the rim and web, and a projection which is adapted to engage in the slot in the rim and web of the other section to form a complete pulley, the sides of the slot being inclined and the projection wedge shaped, means for fastening the webs of the pulley sections together, and means for fastening the pulley on the shafting, substantially as set forth.

In witness whereof I have signed this specification in the presence of two witnesses.

WILLIAM JOSEPH MANNING.

Witnesses:
 J. E. S. RAND,
 AGNES MANNING.